No. 619,278. Patented Feb. 14, 1899.
D. J. CASHIN.
REEL.
(Application filed Feb. 8, 1898.)

(No Model.)

Witnesses:
C. M. Catlin
D. W. Gould.

Inventor:
Danl. J. Cashin,
by Benj. R. Catlin Atty

THE NORRIS PETERS CO., PHOTO-LITHO., WASHINGTON, D. C.

UNITED STATES PATENT OFFICE.

DANIEL J. CASHIN, OF NEWBURG, NEW YORK, ASSIGNOR OF ONE-HALF TO JOHN H. STANTON, OF SAME PLACE.

REEL.

SPECIFICATION forming part of Letters Patent No. 619,278, dated February 14, 1899.

Application filed February 8, 1898. Serial No. 669,575. (No model.)

*To all whom it may concern:*

Be it known that I, DANIEL J. CASHIN, a resident of Newburg, in the county of Orange and State of New York, have invented certain new and useful Improvements in Reels; and I do hereby declare the following to be a full, clear, and exact description of the invention, such as will enable others skilled in the art to which it pertains to make and use the same.

The invention relates to winding wire and other material; and its objects are to provide an efficient reel and furnish it with means for accurately regulating the tension between wide limits and to secure other advantages.

The invention consists in the construction hereinafter described and pointed out.

Figure 1:
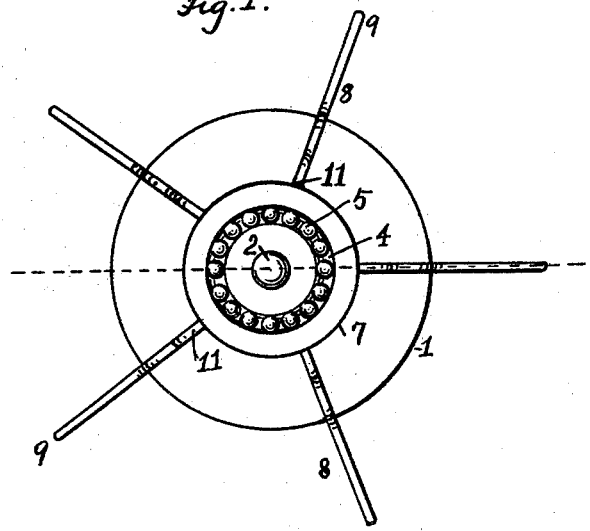
Figure 2:
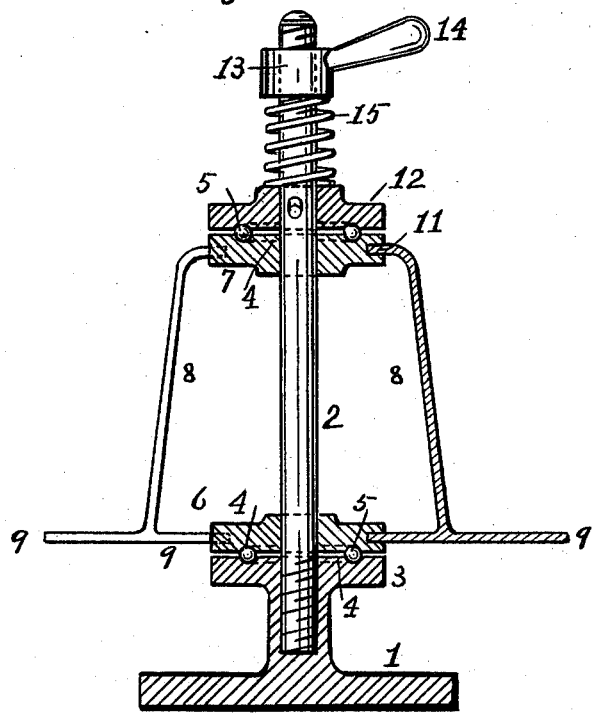

In the accompanying drawings, Figure 1 is a plan of the reel, an adjustable ball-bearing plate, spring, and adjusting-nut being removed; and Fig. 2 is a vertical section of the reel.

Numeral 1 denotes a base or stand which has a screw-threaded socket to receive a post 2. The base is provided at its upper part with a plate 3, having an annular groove 4 to receive balls 5.

6 and 7 indicate ball-bearing disks, each provided with an annular ball-receiving groove 4, as indicated. These disks constitute the ends or heads of the reel and are fitted to rotate on the post 2.

The reel-heads are connected and held in fixed relation to each other by members 8, constituting the reel-body. These may consist of rods, wires, or plates having horizontal parts 9, fixed in disk 6 and extending outwardly beyond the part 10, as shown. The latter are preferably inclined inwardly toward their top and connected by short horizontal portions 11 with the upper disk 7. This makes an approximately frusto-conical reel-body suitable for receiving coils dropped from above and providing for their easy removal and the substitution of others.

12 is a ball-bearing plate connected to the post 2 by a pin fixed in the disk and passing through an oblong slot in the post. Said post is screw-threaded at its upper end to receive a nut 13, having a handle 14, whereby the nut may conveniently be run up and down upon the post.

15 indicates a spring adapted to press the plate 12 upon the subjacent balls and mediately to act in similar manner upon the lower disks and balls and opposing plate. The tension of the spring can be varied at will by suitable manipulation of the nut, and the friction of the balls can thus be nicely varied, and the devices are adapted for use as a brake upon the reel when wire or the like is drawn from it.

It is important that the reel shall neither overrun nor drag too much when wire is unwound from it. In the former case too much wire is unwound and in the latter an unnecessary amount of work is required. In wire-nail making, for example, it is important that an accurate and uniform length of wire be unwound at each step, and since the size and consequent resistance of wire varies largely means for adjusting the tension to suit extreme and intermediate sizes is desirable.

The particular form and proportions shown are suitable; but they may be varied without departing from the principles of operation and construction.

Obviously the particular form of the base, or spring, or hand nut, or body-wires, or their number, or the number of friction-balls, or the direction of the post, or any like detail is unessential.

Having described my invention, what I claim is—

1. In a reel, a post or the like, disks connected by wires and grooved to receive balls, plates correspondingly grooved and fixed against rotation on the post, one of the plates and both disks being movable lengthwise the post and the disks rotatable thereon, balls situated between the disks and plates, and a tension device acting upon a non-rotatable plate, substantially as described.

2. In a reel, the stand having a plate 3 and a post 2, the disks 6 and 7 joined by arms 8, said plate and disks being loose on the post, plate 12 movable endwise of the post, devices for preventing the rotation of the said plate, a spring bearing on the plate 12, and means for varying the tension of the spring at will, substantially as described.

In testimony whereof I have signed this specification in the presence of two subscribing witnesses.

DANIEL J. CASHIN.

Witnesses:
 ISAAC B. LOZIER,
 WM. A. CLEARY TOOHEY.